United States Patent [19]

Hata

[11] Patent Number: 4,758,254

[45] Date of Patent: Jul. 19, 1988

[54] MOISTURE-REMOVAL APPARATUS

[75] Inventor: Yasuhisa Hata, Akashi, Japan

[73] Assignee: Nippon Air Brake Co., Ltd., Kobe, Japan

[21] Appl. No.: 116,825

[22] Filed: Nov. 5, 1987

[30] Foreign Application Priority Data

Nov. 11, 1986 [JP] Japan .................. 61-172798[U]

[51] Int. Cl.[4] ............................................. B01D 50/00
[52] U.S. Cl. ........................................ 55/316; 55/387
[58] Field of Search .................................. 55/387–389, 55/316, 278; 210/DIG. 6, DIG. 7, 510

[56] References Cited

U.S. PATENT DOCUMENTS 2,951,551  9/1960  West ................................... 55/316
4,361,425 11/1982  Hata ................................... 55/389

Primary Examiner—Bernard Nozick
Attorney, Agent, or Firm—J. O. Ray, Jr.

[57] ABSTRACT

This invention provides a pneumatic system moisture-removal apparatus wherein an end surface of an absorbent body is formed as a conical shape. The apparatus includes an end plate approximately perpendicular to the axial direction of the absorbent body fixed on the top portion of the end surface of the cone. A narrow space is located between the end plate and the conical-shaped end surface which serves as a passageway for compressed air. Compressed air is supplied to the apparatus from an outside circumference of the absorbent body to the center in a radial direction. The moisture-removal apparatus includes a honeycomb-type cylindrical absorbent body having a plurality of apertures. Compressed air is communicated into one end surface of the absorbent body in an axial direction. Moisture is extracted as the air passes through the apertures and is discharged from the opposite end surface of the absorbent body.

61 Claims, 3 Drawing Sheets

MOISTURE-REMOVAL APPARATUS

FIELD OF THE INVENTION

The present invention relates, in general, to moisture-removal equipment which is used, for example, in the pneumatic supply systems of railroad equipment in which the compressed air from the air compressor is dried prior to communication into the air reservoir and, more particularly, this invention relates to a moisture removal apparatus including a cylindrical honeycomb-type absorbent that has a number of penetrating apertures in an axial direction.

BACKGROUND OF THE INVENTION

Moisture-removal equipment for pneumatic systems are known in the prior art. One such prior art moisture-removal apparatus is described in Japanese Utility Model No. 54-24773 (Jikkai). This moisture-removal apparatus is illustrated in FIG. 6. In FIG. 6, the main body of the moisture-removal apparatus is designated 10. Connected for fluid communication with an inlet 12 on the main body 10 is an air compressor 20. An air reservoir 30 is connected for fluid communication with an outlet 13 on the main body 10. A drain valve 40 is connected to a drain outlet 14, positioned adjacent the bottom portion of the main body 10. Furthermore, there is a check valve 15, in which the direction of outlet 13 is the normal direction, and a throttle 16, which is parallel to check valve 15, provided on the main body 10 of the prior art moisture-removal apparatus. An absorbent body 1 is positioned in a containing chamber 11 that is formed in the main body 10. The absorbent body 1 includes a number of fluid penetration apertures 2 in the axial direction (vertical direction in FIG. 6), and an absorbent 3 is contained between the adjoining penetration aperture 2 to form a honeycomb-shaped cylinder. In addition, there is a filter 19 provided at the inlet side end surface of the absorbent body 1.

In operation of this prior art moisture-removal apparatus, when the air compressor 20 is operating, the compressed air discharged from such air compressor 20 is communicated into the main body 10 from the inlet 12 and reaches the filter 19 adjacent the one end surface (lower surface in FIG. 6) of the absorbent body 1. The air is communicated in the axial direction of the absorbent body 1 and is dried by the absorbent 3 while it passes through the penetration apertures 2.

The air thus dried exists through the other end surface (upper surface in FIG. 6) of the absorbent body 1 and, after passing through the check valve 15, is communicated to the air reservoir 30 from the outlet 13 in the main body 10 of the moisture-removal apparatus. During the time the air compressoir 20 is in operation, the drain valve 40 is closed. When the air compressor 20 is shut off, the drain valve 40 opens and at least a portion of the dried air stored in the air reservoir reverse-flows inside the absorbent body 1 through the outlet 13 and the throttle 16. After the absorbent 3 is regenerated by this reverse-flow of dried air from the air reservoir, the air is discharged from the main body 10 via the drain valve 40.

One problem with this type of prior art moisture-removal equipment is that the compressed air from the air compressor 20 is supplied via narrow tubing. Consequently, when the compressed air flows into the main body 10, it will tend to cause channeling. Such channeling depends upon the flow direction and/or the flow amount. In addition, the air passage resistance in the penetration apertures 2 of the absorbent body 1 is generally smaller than that in the case which the granular absorbent particles are filled. Further, because these penetration apertures 2 are independent from each other, the above-mentioned channeling effect will not be corrected in the absorbent body 1. For this reason, the entire absorbent 3 may not be used evenly and, as a result, the specified drying capacity of the moisture-removal apparatus will not always be obtained.

SUMMARY OF THE INVENTION

A pneumatic system moisture-removal apparatus is provided in which at least one end surface of the absorbent body is formed as a conical shape. The moisture-removal apparatus includes an end plate, which is approximately perpendicular to the axial direction of the absorbent body, fixed on the top portion of the end surface of this cone. There is a narrow space located between this end plate and the conical-shaped end surface, which is designed as the supply passage for the compressed air. The compressed air is supplied to the moisture-removal apparatus from the outside circumference of the absorbent body to the center in the radial direction. In the moisture-removal apparatus of the present invention, there is a honeycomb-type cylindrical absorbent body having a plurality of apertures. The compressed air is communicated into one end surface of this absorbent body in the axial direction. Moisture is extracted from this compressed air as it passes through the above-mentioned apertures, and is discharged from the other end surface of the absorbent body.

OBJECTS OF THE PRESENT INVENTION

It is, therefore, one of the primary objects of the present invention to provide a pneumatic system moisture-removal apparatus, which decreases the drift just before the compressed air flows into penetration apertures of the absorbent.

Another object of the present invention is to provide a pneumatic system moisture-removal apparatus which will substantially achieve the rated drying capacity of the absorbent.

A further object of the present invention is to provide a pneumatic system moisture-removal apparatus which will minimize channeling.

The above-described objects and various other objects and advantages of the present invention will become more readily apparent to those persons skilled in the pneumatic systems art from the following more detailed description of the present invention, when such description is taken in conjunction with the attached drawings and with the appended claims.

BRIEF DESCRIPTION OF THE INVENTION

Figure 1:
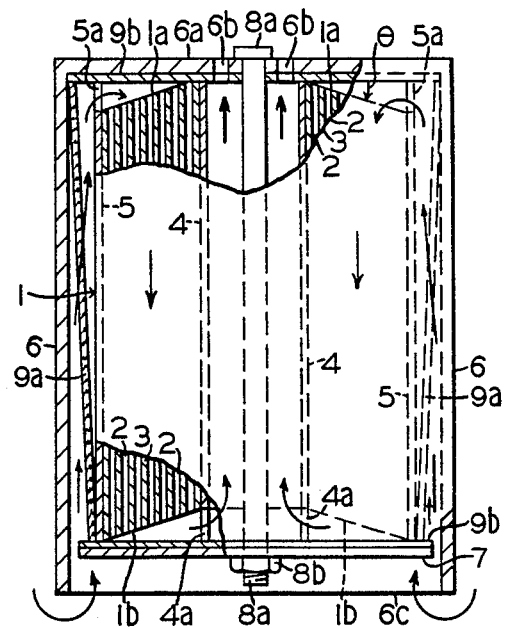
FIG. 1 is a side view, partially in cross-section, of one presently preferred embodiment of a moisture-removal apparatus according to the present invention.

When referring to the several views in the drawings, it should be noted that identical components have been identified with identical reference numerals.

Figure 6:
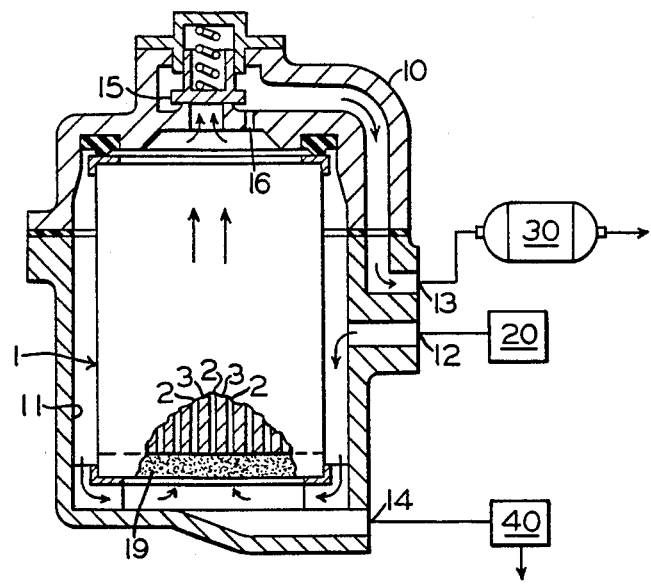
FIG. 6 is a side view, partially in cross-section, of a moisture-removal apparatus which is known in the prior art.

Now refer more particularly to FIG. 1 for an understanding of one presently preferred embodiment of the moisture-removal apparatus of the present invention. In FIG. 1, only the absorbent body 1 structure is illustrated. The absorbent body 1 of a drying cylinder assembly structure would be fixed in a containing chamber, such as the containing chamber 11 of the main body 10 of a drying cylinder assembly, shown in FIG. 6. One end surface 1a, which is the upper surface in FIG. 1 of the absorbent body 1 in the axial direction, is the low cone. In order to maintain the integrity of the absorbent body 1, there is provided an inner cylinder 4 and an outer cylinder 5 which are fixed in a substantially tight manner with an inner circumference and an outer circumference, respectively, of the absorbent body 1. Such inner cylinder 4 and outer cylinder 5 are preferably of an aluminum alloy to provide lightweight reinforcement to the absorbent body 1. Adjacent one end of the outer cylinder 5, there is a cut-out portion 5a to provide an air communication passageway. The other end surface 1b, which is the bottom surface in FIG. 1 of the absorbent body 1 in the axial direction, is the shallow conical-shaped portion. There is a cut-out portion 4a provided in the end of the inner cylinder 4, which serves as an air communication passageway. The cut-out portions 5a and 4a are positioned axially opposite each other in the presently preferred arrangement of the moisture-removal apparatus of the present invention. The absorbent body 1 is retained substantially concentrically within a cylindrical cover 6, which serves as a housing or shell for the absorbent body 1. The outermost portion of one end surface 1a of the absorbent body 1 is positioned substantially perpendicular to and adjacent the base plate 6a of the cover 6. The opposite end surface 1b of the absorbent body 1 is positioned adjacent a retaining plate 7, and the absorbent body 1 is secured in this position by a bolt 8a and a nut 8b. In this manner, the absorbent body 1 is sandwiched between the retaining plate 7 and the base plate 6a of the cover 6. A filter 9a is provided in the annular space between the outside circumference of the absorbent body 1 and the inside circumference of the cover 6. A first gasket 9b is positioned between the one end surface 1a of the absorbent body 1 and the base plate 6a of the cover 6, and a second gasket 9b is positioned between the other end surface 1b of the absorbent body 1 and the retaining plate 7. An air communication outlet 6b is provided generally at the center of the base plate 6a and the first gasket 9b.

When the moisture-removal apparatus of the present invention is in operation in a pneumatic system, the compressed air supplied from a source located outside of the cover 6 passes through the flow inlet 6c and the filter 9a adjacent the outer circumference of the absorbent body 1. The flow inlet 6c is adjacent the open end (bottom end of FIG. 1) of the cover 6. After passing through the filter 9a, the air reaches the one end surface 1a of the absorbent body 1. In view of the fact that this end surface 1a has a low conical shape, the narrow flow passage between this end surface 1a and the base plate 6a becomes more narrow as it approaches the center of the absorbent body 1 in the radial direction. Because of this constricting effect, the amount of air which flows inwardly to the penetration apertures 2 of the absorbent body 1 is adjusted in such a manner that the amount of air is smaller when it is near the center in the radial direction and, as a result, the flow amount per each unit volume of the absorbent 3 becomes much more uniform or almost equal. Moisture is removed from the compressed air by the absorbent 3 as it is communicated out of the absorbent body 1 through the other end surface 1b of such absorbent body 1. After leaving the absorbent body 1, the dried air is passed through the cut-out portion 4a in the inner cylinder 4, and up through the inner hole of the absorbent body 1, and out through the flow outlet 6b. The inner hole of the absorbent body 1 is defined by the inner side wall of the inner cylinder 4.

The angle $\theta$, defined by the conical end surface 1a of the absorbent body 1 and a surface of the first gasket 9b, is normally less than about 10 degrees. It should be noted, however, that the longer the end surface area of the absorbent is, the smaller this angle should be, and the compressed air should be adjusted to flow into the absorbent particles as evenly as possible over the entire area.

Circumstances are not presently contemplated where it would be necessary to exceed an angle $\theta$ of more than 10 degrees on pneumatic systems in use today.

Figure 2:
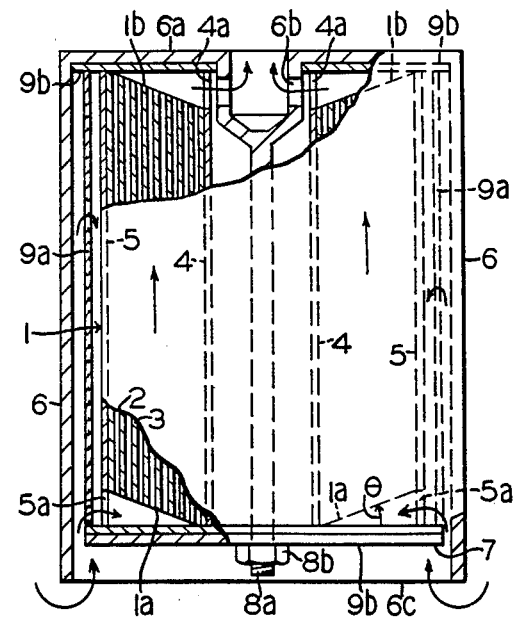
FIG. 2 is a side view, partially in cross-section, of a first alternaive embodiment of a moisture-removal apparatus according to the present invention.

Now refer more particularly to FIG. 2 for an understanding of an alternative embodiment of the moisture-removal apparatus illustrated in FIG. 1 and described above. For the sake of brevity, only those points which are different will be described hereinafter. In this alternative embodiment of the present invention, the installation of the absorbent body 1 within the cover 6 is in a reverse position of that shown in FIG. 1. In this case, the retaining plate 7 is made to be the end plate, and the filter 9a is a generally uniform cylinder. The remaining parts are substantially the same as FIG. 1.

Figure 3:
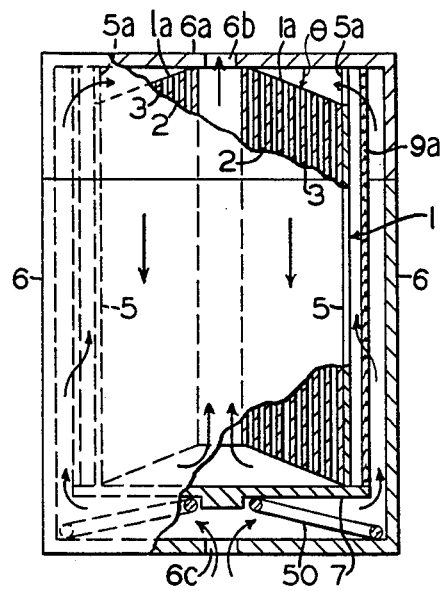
FIG. 3 is a side view, partially in cross-section, of a second alternative embodiment of a moisture-removal apparatus according to the present invention.

Now refer more particularly to FIG. 3 for an understanding of another alternative embodiment of the moisture-removal apparatus illustrated in FIGS. 1 and 2 and which have been described in detail above. The principle differences between the embodiment illustrated in FIG. 1 and this alternative embodiment are that the absorbent body 1 is supported by a spring 50 positioned in the cover 6, and that the inner cylinder 4 which forms the inside circumference of the absorbent body 1 is eliminated, so that only the outer cylinder 5 is provided. Furthermore, the gaskets 9b in this embodiment are not required. The remaining parts illustrated in FIG. 3 have been identified with corresponding parts shown in FIGS. 1 and 2, and a detailed description has been eliminated.

Figure 4:
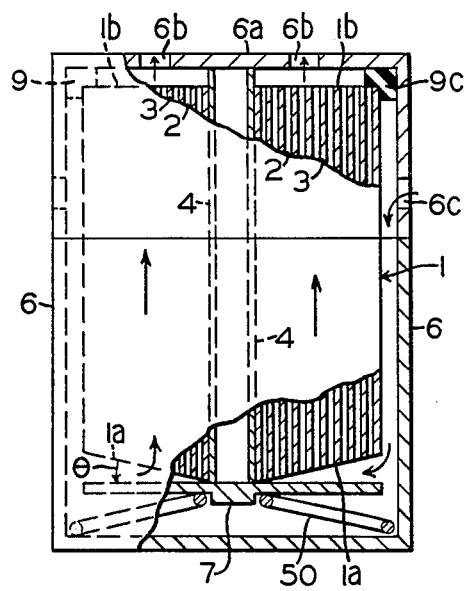
FIG. 4 is a side view, partially in cross-section, of a third alternative embodiment of a moisture-removal apparatus according to the present invention.

Reference is now made to FIG. 4 for an understanding of still another alternative embodiment of the moisture-removal apparatus which was illustrated in FIGS. 1-3, and which was described in some detail above. In this alternative embodiment of the present invention, it can be seen that the one end surface 1b of the absorbent body 1 is a flat surface, and that the installation of the absorbent body 1 into the cover 6 is in the reverse direction. In this embodiment, the gasket 9c is somewhat thicker and is provided with a flexible seal. Furthermore, it can be seen that the outer cylinder 5 and the filter 9a have been eliminated in this embodiment. An explanation of the remaining components has been eliminated, since they are essentially the same as described previously.

Figure 5:
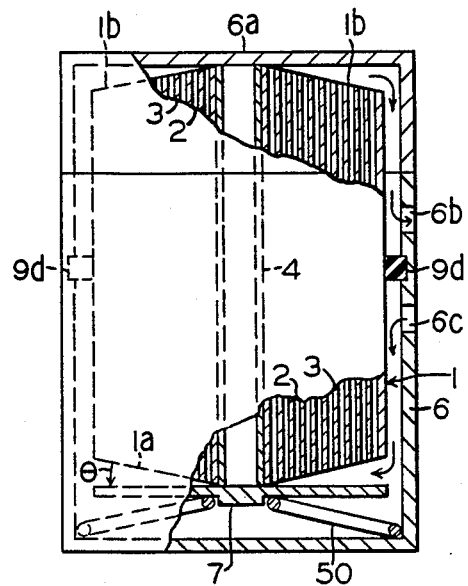
FIG. 5 is a side view, partially in cross-section, of a fourth alternative embodiment of a moisture-removal apparatus according to the present invention.

Reference is now made to FIG. 5 for an understanding of a further alternative embodiment of the moisture-removal apparatus of the present invention. The main differences between the embodiment illustrated in FIG. 5 and the embodiment shown in FIG. 4 are that both end surfaces 1a and 1b of the absorbent body 1 are of a conical shape, and that the positions of the flow inlet 6c and of the flow outlet 6b of the cover 6 are changed. In this embodiment, there is a seal member 9d provided between the two holes 6b and 6c in the cover 6. A detailed description of the remaining elements has been omitted.

It can be seen from the above description of the various embodiments of the moisture-removal apparatus of the present invention that the present invention meets the objectives of the invention by substantially decreasing the drift just before the compressed air flows into the penetration apertures of the absorbent body. This is accomplished in one of the presently preferred embodiments of the invention by forming one end surface of the absorbent body in a cone shape, and by fixing the end plate onto the top of the cone surface in a position such that it is almost perpendicular to the axial direction. The narrow space between this end plate and the cone end surface of the absorbent body becomes the communication passage for the compressed air, which is supplied from the outside surface of the absorbenty body toward the center in the radial direction.

By the technique provided by the present invention, the communication passage of the compressed air to the absorbent body is the narrow space located between the low cone end surface in the axial direction of the absorbent body and the end plate which is fixed on its top. Such end plate is positioned approximately perpendicular to the axial direction of the absorbent body. Because this air communication passage becomes more narrow when it becomes nearer to the center of the radial direction of the absorbent body, it provides a constricting effect at this narrow area, thereby enabling the amount of air which flows in to be adjusted. That is, the nearer the aperture is to the center of the absorbent body, the smaller the air flow becomes. The absorbent body of the present invention is a honeycomb-shaped cylinder so that the outer rim has more absorbent therein, and the inner portion contains lesser amounts of absorbent. Therefore, according to the present invention, the flow control by the above-described constricting effect can make it possible to supply an amount of compressed air, which will correspond to an amount of the absorbent contained in the absorbent body, and the flow amount per each unit volume will be substantially equal so that the drying efficiency of the absorbent can be improved.

While a number of alternative embodiments of a pneumatic system moisture-removal apparatus have been described in detail above, it should be obvious that those persons skilled in the pneumatic art can make other modifications and adaptations of the present invention without departing from the spirit and scope of the appended claims.

I claim:

1. A moisture-removal apparatus for use in a drying cylinder assembly in a pneumatic system to remove moisture from a compressed gas in such pneumatic system, said moisture-removal apparatus comprising:

(a) a housing member suitable for installation in an interior portion of a chamber of such drying cylinder assembly, said housing member including at least one end wall;

(b) a first fluid communication passageway for communicating a moisture containing compressed gas to an interior portion of said housing member;

(c) a second fluid communication passageway for communicating a substantially moisture-free gas from said interior portion of said housing member;

(d) an absorbent body member positioned within said housing member to absorb substantially all moisture in said moisture containing compressed gas, said absorbent body member including a predetermined plurality of gas penetration apertures extending through said absorbent body member in a longitudinal direction;

(e) a predetermined amount of absorbent material positioned within said absorbent body member for absorbing said moisture in said moisture containing compressed gas;

(f) at least one end of said absorbent body member having a cone shape, said cone shape being formed by tapering said at least one end of said absorbent body member outwardly and downwardly or outwardly and upwardly from a predetermined point adjacent a longitudinal axis of said absorbent body member, said at least one end being at an end where said moisture containing compressed gas enters said absorbent body member through said gas penetration apertures; and (g) a retainer means engageable with said housing member and said absorbent body member for retaining said absorbent body member within said housing member.

2. A moisture-removal apparatus, according to claim 1, wherein said first fluid communication passagewy is in annular opening located between said retaining means and an inner surface of said housing member.

3. A moisture-removal apparatus, according to claim 1, wherein said second fluid communication passageway is an aperture adjacent said at least one end wall of said housing member.

4. A moisture-removal apparatus, according to claim 1, wherein said housing member further includes an end wall axially opposite said at least one end wall.

5. A moisture-removal apparatus, according to claim 4, wherein said moisture-removal apparatus further includes a filter member positioned between an outer surface of said absorbent body member and an inner surface of said housing member, said filter member extending in a longitudinal direction between said at least one end wall of said housing member and said retaining means.

6. A moisture-removal apparatus, according to claim 4, wherein said absorbent body member further includes an inner cylinder member to provide support to said absorbent body member.

7. A moisture-removal apparatus, according to claim 4, wherein said absorbent body member further includes an outer cylinder member to provide support to said absorbent body member.

8. A moisture-removal apparatus, according to claim 4, wherein said retaining means includes:

(a) a plate member positioned adjacent one end of said absorbent body member; and (b) a spring means positioned intermediate said plate member and said end wall axially opposite said at least one end wall of said housing member for urging said plate member against at least a portion of said one end of said absorbent body member.

9. A moisture-removal apparatus, according to claim 8, wherein said moisture-removal apparatus further includes a gasket member intermediate said at least one end wall and an end of said absorbent body member opposite said at least one end of said absorbent body member having a cone shape.

10. A moisture-removal apparatus, according to claim 9, wherein said first fluid communication passageway is positioned in one of said end wall of said housing member axially opposite said at least one end wall and a side wall of said housing member.

11. A moisture-removal apparatus, according to claim 9, wherein said end of said absorbent body member opposite said at least one end of said absorbent body member is substantially parallel to said at least one end wall of said housing member over an entire surface area of said end of said absorbent body member.

12. A moisture-removal apparatus, according to claim 4, wherein said moisture-removal apparatus further includes a gasket member engaging an outer surface of said absorbent body member and an inner surface of said housing member intermediate said at least one end wall of said housing member and said end wall axially opposite said at least one end wall.

13. A moisture-removal apparatus, according to claim 12 wherein said first fluid communication passageway is positioned in a side wall of said housing member intermediate said gasket member and said end wall of said housing member axially opposite said at least one end wall.

14. A moisture-removal apparatus, according to claim 13, wherein said second fluid communication passageway is positioned in said side wall of said housing member intermediate said at least one end wall of said housing member and said gasket member.

15. A moisture-removal apparatus, according to claim 12, wherein said absorbent body member includes a tapered portion at one end opposite said at least one end, said tapered portion being tapered outwardly and downwardly from said predetermined point adjacent a longitudinal axis of said absorbent body member.

16. A moisture-removal apparatus, according to claim 1, wherein said at least one end of said absorbent body member forms an angle of no more than about 10 degrees with respect to one of said at least one end wall of said housing means and said retainer means.

17. A moisture-removal apparatus, according to claim 16, wherein said absorbent body member includes a tapered portion at an end opposite said at least one end, said tapered portion being tapered inwardly and downwardly toward said longitudinal axis of said absorbent body member.

18. A moisture-removal apparatus, according to claim 16, wherein said moisture-removal apparatus further includes a filter member positioned between an outer surface of said absorbent body member and an inner surface of said housing member, said filter member extending in a longitudinal direction between said at least one end wall of said housing member and said retaining means.

19. A moisture-removal apparatus, according to claim 16, wherein said moisture-removal apparatus further includes:

(a) a first gasket member positioned intermediate one end of said absorbent body member and said at least one end wall of said housing member; and (b) a second gasket member positioned intermediate an axially opposite end of said absorbent body member and said retainer means.

20. A moisture-removal apparatus, according to claim 16, wherein said absorbent body member further includes an inner cylinder member to provide support to said absorbent body member.

21. A moisture-removal apparatus, according to claim 16, wherein said absorbent body member further includes an outer cylinder member to provide support to said absorbent body member.

22. A moisture-removal apparatus, according to claim 21, wherein said outer cylinder member further includes at least one aperture through a wall portion adjacent said at least one end of said absorbent body member having said cone shape, said aperature providing a fluid communication passageway for said moisture containing compressed gas.

23. A moisture-removal apparatus, according to claim 16, wherein said retainer means includes a plate member positioned axially opposite said at least one end wall of said housing member and substantially perpendicular to said longitudinal axis of said absorbent body member.

24. A moisture-removal apparatus, according to claim 23, wherein said absorbent body member includes a tapered portion at an end opposite said at least one end, said tapered portion being tapered inwardly and downwardly toward said longitudinal axis of said absorbent body member.

25. A moisture-removal apparatus, according to claim 1, wherein said retainer means includes a plate member positioned axially opposite said at least one end wall of said housing member and substantially perpendicular to said longitudinal axis of said absorbent body member.

26. A moisture-removal apparatus, according to claim 25, wherein said absorbent body member includes a tapered portion at an end opposite said at least one end, said tapered portion being tapered inwardly and downwardly toward said longitudinal axis of said absorbent body member.

27. A moisture-removal apparatus, according to claim 25, wherein said retainer means includes a rod member engageable at a first end thereof with said at least one end wall of said housing member, said rod member includes a threaded portion adjacent a second end thereof and said plate member is secured in position by a nut threadedly engaging said threaded portion of said rod member.

28. A moisture-removal apparatus, according to claim 25, wherein said moisture-removal apparatus further includes:

(a) a first gasket member positioned intermediate one end of said absorbent body member and said at least one end wall of said housing member; and (b) a second gasket member positioned intermediate an axially opposite end of said absorbent body member and said plate member of said retainer means.

29. A moisture-removal apparatus, according to claim 25, wherein said absorbent body member further includes an outer cylinder member to provide support to said absorbent body member.

30. A moisture-removal apparatus, according to claim 25, wherein said moisture-removal apparatus further includes a filter member positioned between an outer surface of said absorbent body member and an inner surface of said housing member, said filter member extending in a longitudinal direction between said at least one end wall of said housing member and said retaining means.

31. A moisture-removal apparatus, according to claim 1, wherein said absorbent body member includes a tapered portion at an end opposite said at least one end, said tapered portion being tapered inwardly and downwardly toward said longitudinal axis of said absorbent body member.

32. A moisture-removal apparatus, according to claim 31, wherein said moisture-removal apparatus further includes a filter member positioned between an outer surface of said absorbent body member and an inner surface of said housing member, said filter member extending in a longitudinal direction between said at least one end wall of said housing member and said retaining means.

33. A moisture-removal apparatus, according to claim 31, wherein said moisture-removal apparatus further includes:
(a) a first gasket member positioned intermediate one end of said absorbent body member and said at least one end wall of said housing member; and
(b) a second gasket member positioned intermediate an axially opposite end of said absorbent body member and said retainer means.

34. A moisture-removal apparatus, according to claim 31, wherein said absorbent body member further includes an outer cylinder member to provide support to said absorbent body member.

35. A moisture-removal apparatus, according to claim 34, wherein said outer cylinder member further includes at least one aperture through a wall portion adjacent said at least one end of said absorbent body member having said cone shape, said aperture providing a fluid communication passageway for said moisture containing compressed gas.

36. A moisture-removal apparatus, according to claim 31, wherein said absorbent body member further includes an inner cylinder member to provide support to said absorbent body member.

37. A moisture-removal apparatus, according to claim 1, wherein said retainer means includes a rod member engageable at a first end thereof with said at least one end wall of said housing member, said rod member includes a threaded portion adjacent a second end thereof and said retainer means is secured in position by a nut threadedly engaging said threaded portion of said rod member.

38. A moisture-removal apparatus, according to claim 37, wherein said rod member is a bolt.

39. A moisture-removal apparatus, according to claim 37, wherein said rod member is formed integral with said at least one end wall of said housing.

40. A moisture-removal apparatus, according to claim 39, wherein said second fluid communication passageway is at least one aperture formed in said rod member adjacent an aperture formed in said at least one end wall of said housing.

41. A moisture-removal apparatus, according to claim 37, wherein said moisture-removal apparatus further includes a filter member positioned between an outer surface of said absorbent body member and an inner surface of said housing member, said filter member extending in a longitudinal direction between said at least one end wall of said housing member and said retaining means.

42. A moisture-removal apparatus, according to claim 37, wherein said moisture-removal apparatus further includes:
(a) a first gasket member positioned intermediate one end of said absorbent body member and said at least one end wall of said housing member; and
(b) a second gasket member positioned intermediate an axially opposite end of said absorbent body member and said retainer means.

43. A moisture-removal apparatus, according to claim 37, wherein said absorbent body member further includes an outer cylinder member to provide support to said absorbent body member.

44. A moisture-removal apparatus, according to claim 37, wherein said absorbent body member further includes an inner cylinder member to provide support to said absorbent body member.

45. A moisture-removal apparatus, according to claim 1, wherein said moisture-removal apparatus further includes a filter member positioned between an outer surface of said absorbent body member and an inner surface of said housing member, said filter member extending in a longitudinal direction between said at least one end wall of said housing member and said retaining means.

46. A moisture-removal apparatus, according to claim 45, wherein said moisture-removal apparatus further includes:
(a) a first gasket member positioned intermediate one end of said absorbent body member and said at least one end wall of said housing member; and
(b) a second gasket member positioned intermediate an axially opposite end of said absorbent body member and said retainer means.

47. A moisture-removal apparatus, according to claim 45, wherein said absorbent body member further includes an outer cylinder member to provide support to said absorbent body member.

48. A moisture-removal apparatus, according to claim 47, wherein said outer cylinder member further includes at least one aperture through a wall portion adjacent said at least one end of said absorbent body member having said cone shape, said aperture providing a fluid communication passageway for said moisture containing compressed gas.

49. A moisture-removal apparatus, according to claim 45, wherein said absorbent body member further includes an inner cylinder member to provide support to said absorbent body member.

50. A moisture-removal apparatus, according to claim 45, wherein said filter member is tapered downwardly and inwardly beginning at a point adjacent said at least one end wall of said housing member.

51. A moisture-removal apparatus, according to claim 45, wherein said filter member is substantially parallel to said outer surface of said absorbent body member and said inner surface of said housing member 52. A moisture-removal apparatus, according to claim 1, wherein said moisture-removal apparatus further includes:
(a) a first gasket member positioned intermediate one end of said absorbent body member and said at least one end wall of said housing member; and (b) a second gasket member positioned intermediate an axially opposite end of said absorbent body member and said retainer means.

53. A moisture-removal apparatus, according to claim 52, wherein said absorbent body member further includes an outer cylinder member to provide support to said absorbent body member.

54. A moisture-removal apparatus, according to claim 53, wherein said outer cylinder member further includes at least one aperture through a wall portion adjacent said at least one end of said absorbent body member having said cone shape, said aperture providing a fluid communication passageway for said moisture containing compressed gas.

55. A moisture-removal apparatus, according to claim 52, wherein said absorbent body member further includes an inner cylinder member to provide support to said absorbent body member.

56. A moisture-removal apparatus, according to claim 1, wherein said absorbent body member further includes an outer cylinder member to provide support to said absorbent body member.

57. A moisture-removal apparatus, according to claim 56 wherein said absorbent body member further includes an inner cylinder member to provide support to said absorbent body member.

58. A moisture-removal apparatus, according to claim 56, wherein said outer cylinder member further includes at least one aperture through a wall portion adjacent said at least one end of said absorbent body member having said cone shape, said aperture providing a fluid communication passageway for said moisture containing compressed gas.

59. A moisture-removal apparatus, according to claim 58, wherein said inner cylinder member includes at least one aperture through a wall portion adjacent an end of said absorbent body member opposite said at least one end, said aperture in said inner cylinder member providing a fluid communication passageway for said substantially moisture-free gas.

60. A moisture-removal apparatus, according to claim 1, wherein said absorbent body member further includes an inner cylinder member to provide support to said absorbent body member.

61. A moisture-removal apparatus, according to claim 60, wherein said inner cylinder member includes at least one aperture through a wall portion adjacent an end of said absorbent body member opposite said at least one end, said aperture in said inner cylinder member providing a fluid communication passageway for said substantially moisture-free gas.

* * * * *